(12) United States Patent  (10) Patent No.: US 8,760,848 B2
Prymak et al.  (45) Date of Patent: *Jun. 24, 2014

(54) CONCENTRATED CAPACITOR ASSEMBLY

(75) Inventors: John D. Prymak, Greer, SC (US); Peter Par Blais, Milford, MA (US); George Haddox, Simpsonville, SC (US); Michael Prevallet, Simpsonville, SC (US); Jim Piller, Simpsonville, SC (US); Chris Stolarski, Greenville, SC (US); Chris Wayne, Moore, SC (US)

(73) Assignee: Kemet Electronics Corporation, Simpsonville, SC (US)

( * ) Notice: Subject to any disclaimer, the term of this patent is extended or adjusted under 35 U.S.C. 154(b) by 383 days.

This patent is subject to a terminal disclaimer.

(21) Appl. No.: 13/315,931

(22) Filed: Dec. 9, 2011

(65) Prior Publication Data

US 2012/0081834 A1    Apr. 5, 2012

Related U.S. Application Data

(62) Division of application No. 12/138,898, filed on Jun. 13, 2008, now Pat. No. 8,125,766.

(51) Int. Cl.
*H01G 4/38*    (2006.01)

(52) U.S. Cl.
USPC ........ 361/328; 361/330; 361/321.2; 361/517; 361/528; 361/303

(58) Field of Classification Search
CPC .......... H01G 4/38; H01G 4/228; H01G 9/08; H01G 9/12; H01G 9/15

USPC ................. 361/328, 330, 516–519, 523–525, 361/528–529

See application file for complete search history.

(56) References Cited

U.S. PATENT DOCUMENTS

| | | |
|---|---|---|
| 4,486,738 A | 12/1984 | Sadlo et al. |
| 4,908,258 A | 3/1990 | Hernandez |
| 5,373,627 A | 12/1994 | Grebe |
| RE35,064 E | 10/1995 | Hernandez |
| 5,497,033 A | 3/1996 | Fillion et al. |
| 5,708,569 A | 1/1998 | Howard et al. |
| 5,866,952 A | 2/1999 | Wojnarowski et al. |
| 6,058,004 A | 5/2000 | Duva et al. |
| 6,097,611 A | 8/2000 | Samaras et al. |
| 6,198,619 B1 | 3/2001 | Fuikoka |
| 6,268,996 B1 | 7/2001 | Landsgesell |
| 6,373,220 B1 | 4/2002 | Wipperfurth et al. |
| 6,400,577 B1 | 6/2002 | Goodwin et al. |
| 6,407,929 B1 | 6/2002 | Hale et al. |
| 6,552,265 B1 | 4/2003 | Bergstedt et al. |
| 6,614,645 B1 | 9/2003 | Sakurai et al. |
| 6,732,428 B1 | 5/2004 | Kwong |

(Continued)

*Primary Examiner* — Nguyen T Ha (74) *Attorney, Agent, or Firm* — Joseph T. Guy; Perkins Law Firm, LLC (57) ABSTRACT

A capacitor assembly with a substrate having a first face and a second face. A multiplicity of capacitors are mounted on the first face wherein each capacitor has a first lead and a second lead of opposite polarity to the first lead. A bridge is in electrical contact with multiple first leads. A tree is in electrical contact with the bridge wherein the tree passes through a via of the substrate and is in electrical contact with a first trace of the second face. A second trace is on the second face wherein the second lead is in electrical contact with the second trace.

40 Claims, 9 Drawing Sheets

(56) References Cited

U.S. PATENT DOCUMENTS

| | | |
|---|---|---|
| 6,757,152 B2 | 6/2004 | Galvagni et al. |
| 6,765,784 B2 * | 7/2004 | Ohya et al. .................... 361/523 |
| 6,844,505 B1 | 1/2005 | Fan et al. |
| 6,847,527 B2 | 1/2005 | Sylvester et al. |
| 6,865,089 B2 | 3/2005 | Ho et al. |
| 6,870,727 B2 | 3/2005 | Edson et al. |
| 6,922,326 B2 | 7/2005 | Kubota et al. |
| 6,963,493 B2 | 11/2005 | Galvagni |
| 6,975,516 B2 | 12/2005 | Asahi et al. |
| 7,006,359 B2 | 2/2006 | Galvagni et al. |
| 7,027,290 B1 | 4/2006 | Thrap |
| 7,051,430 B2 | 5/2006 | Bergstedt et al. |
| 7,057,878 B2 | 6/2006 | Vierow et al. |
| 7,126,811 B2 * | 10/2006 | Hirano et al. ................ 361/523 |
| 7,403,147 B2 | 7/2008 | Klaassen |
| 8,125,766 B2 * | 2/2012 | Prymak et al. ................ 361/328 |
| 2002/0175402 A1 | 11/2002 | McCormack et al. |
| 2004/0165361 A1 | 8/2004 | Kimura et al. |

* cited by examiner

CONCENTRATED CAPACITOR ASSEMBLY

CROSS-REFERENCE TO RELATED APPLICATIONS

This application is a divisional application of U.S. patent Ser. No. 12/138,898 filed Jun. 13, 2008 now U.S. Pat. No. 8,125,766.

FIELD OF THE INVENTION

The present invention is directed to a concentrated capacitor assembly. More particularly the present invention is related to a capacitor assembly wherein the available capacitance volume greatly exceeds the current art.

BACKGROUND OF THE INVENTION

Capacitors are widely used in electronic circuitry to store charge. They are particularly useful in applications wherein a rapid high voltage charge, or surge charge, is required. In general, the capacitors are charged by a power source and release the charge as needed.

Modern applications place an ever increasing demand on surge charge requirements. At the same time there is an ever increasing demand to miniaturize electronic components and devices. These two desires are in direct conflict.

One approach to the desire for a surge charge is to have a module comprising multiple capacitors. If a higher voltage charge is required the number of capacitors, or the size of the capacitors, is increased. Unfortunately, this approach is in direct conflict with miniaturization efforts.

Figure 10:
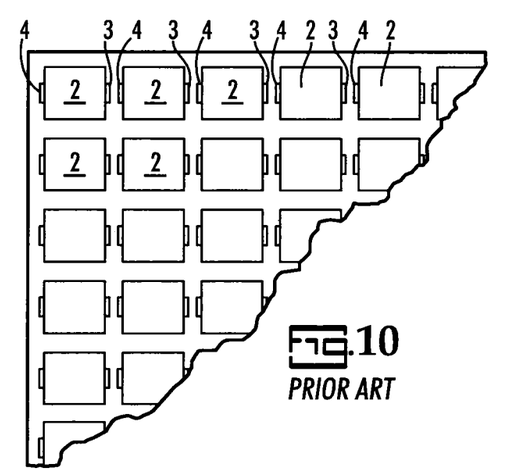
FIG. 10 is a prior art capacitor assembly.

A prior art capacitor assembly is illustrated schematically in FIG. 10. In FIG. 10, a multiplicity of capacitors, typically in a grid, are surface mounted as typically employed in the art. Each capacitor, 2, comprises an anode lead, 3, and cathode termination, 4. The packing density of capacitors is limited by the necessity to have the capacitors sufficiently separated to avoid electrical shorts between the adjacent capacitors. Therefore, the maximum packing density of capacitors has been reached in the art.

Yet another problem in the art is the inflexibility of the capacitor modules. These are typically designed and manufactured for a specific application which greatly increases the cost. There is a desire for a module which can be configured in multiple arrangements easily.

There has been an ongoing desire for a capacitor module which is small yet which can provide a large instantaneous charge. There has also been an ongoing desire for a capacitor module which can be configured for multiple uses.

SUMMARY OF THE INVENTION

It is an object of the invention to provide a capacitor array with an increased density of capacitors.

It is another object of the present invention to provide a capacitor assembly, or array, which can be configured with subsets of capacitors utilized independently.

These and other advantages, as will be realized, are provided in a capacitor assembly with a substrate having a first face and a second face. A multiplicity of capacitors are mounted on the first face. Each capacitor has a first lead and a second lead of opposite polarity to the first lead. A bridge is in electrical contact with multiple first leads. A tree is in electrical contact with the bridge wherein the tree preferably passes through a via or plated through hole of the substrate and is in electrical contact with a first trace preferably of the second face. A second trace is preferably on the second face wherein the second lead is in electrical contact with the second trace.

Yet another embodiment is provided in a capacitor assembly. The capacitor assembly has a substrate with a first face and a second face. A multiplicity of capacitors is mounted on the first face wherein each capacitor has an anode and a cathode. An anode lead extending away from the substrate is in electrical contact with the anode and a cathode termination preferably extending through a via or plated through hole is in electrical contact with the cathode. An anode bridge is in electrical contact with multiple anode leads wherein the capacitor is preferably between the anode bridge and the substrate. An anode tree is in electrical contact with the anode bridge wherein the anode tree preferably passes through a via or plated through hole of the substrate and is in electrical contact with an anode trace of the second face. A cathode trace is on the second face wherein the cathode lead preferably extends through a via or plated through hole and is in electrical contact with the cathode trace.

Yet another embodiment is provided in a capacitor assembly with a substrate having a first face and a second face. A multiplicity of capacitors is mounted on the first face wherein each capacitor has a first lead and a second lead of opposite polarity to the first lead. A bridge is in electrical contact with multiple first leads. A tree is in electrical contact with the bridge wherein the tree preferably passes through a via or plated through hole of the substrate and is in electrical contact with a first trace preferably of the second face. A pad is in electrical contact with the second lead. A second trace is preferably on the second face and a fuse is between the pad and second trace.

DETAILED DESCRIPTION OF THE INVENTION

The present invention will be described with reference to the various figures forming an integral non-limiting part of the specification. Throughout the various drawings similar elements will be numbered accordingly.

Figure 1:
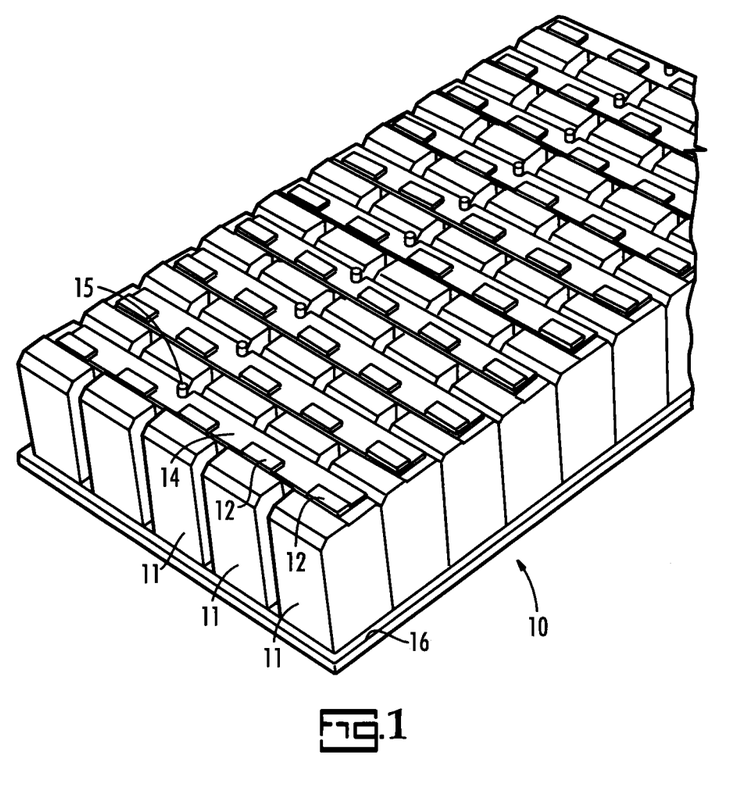
FIG. 1 is a schematic perspective top view of an embodiment of the present invention.
Figure 2:
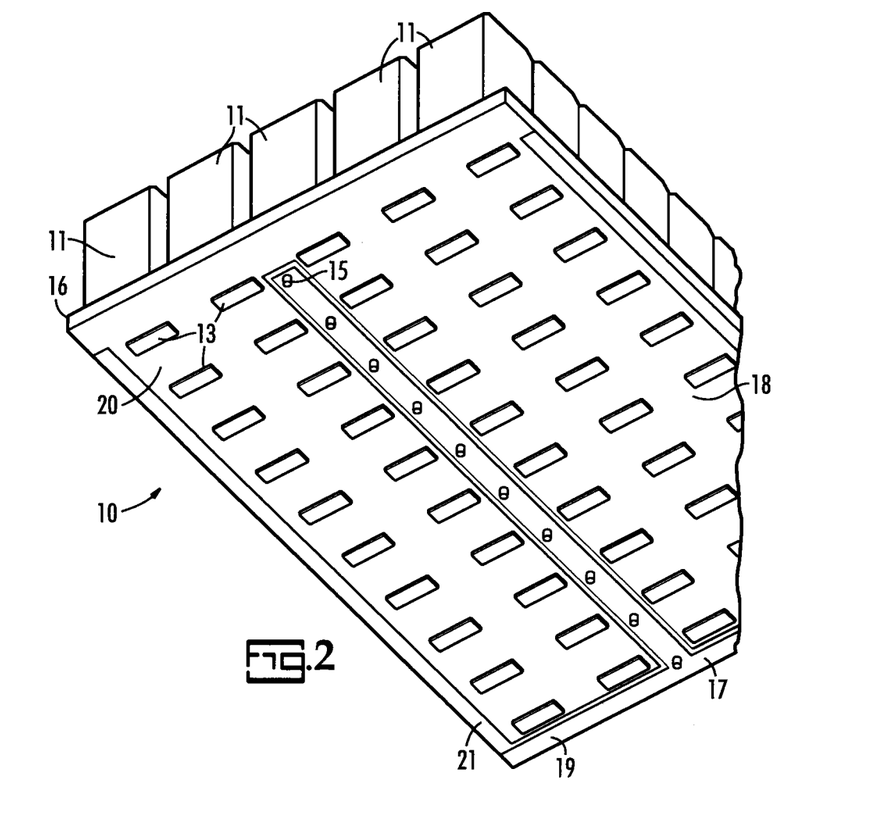
FIG. 2 is a schematic perspective bottom view of the embodiment of FIG. 1.

An embodiment of the invention is illustrated schematically in perspective top view in FIG. 1 and in perspective bottom view in FIG. 2. In FIGS. 1 and 2 the capacitor assembly, generally represented at 10, comprises a multiplicity of capacitors, 11, generally arranged in a grid pattern. Each capacitor has a first termination, 12, and a second termination, 13. It is preferred that the first termination is an anode termination and the second termination is a cathode termination without limit thereto. The terms lead and termination are used interchangeably herein as understood in the art. A bridge, 14, connects at least a portion of a row of first leads. The bridge could connect columns of first leads, subsets of a row or column or regions of the grid without departing from the invention. Each bridge is in electrical contact with a tree, 15, which preferably passes to and more preferably through the substrate, 16, to form an electrical contact with a first trace, 17, preferably on the bottom of the substrate. Each second lead preferably passes through the substrate, 16, and is in electrical contact with a second trace, 18. The embodiment illustrated comprises a first land, 19, and a second land, 20, illustrated on opposite edges of the module. This is a preferred embodiment however the first and second land can be in any location most preferably around the periphery. In use the module would be attached to an electrical circuit with the first land and second land in electrical contact with the appropriate trace of the electrical circuit. An insulator, 21, separates the first trace from the second trace. It is desirable for the capacitor assembly to have at least one fuse. In a preferred embodiment multiple capacitors, such as those in a row in the embodiment of FIGS. 1 and 2 would be fused as a group. In a particularly preferred embodiment each capacitor is individually fused. Fuses are not illustrated in FIGS. 1 and 2. In one embodiment the fuses are internal to the capacitor body. In another embodiment fuses are exterior to the capacitor body.

Figure 3:
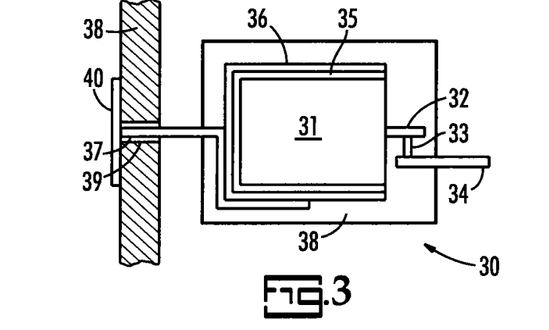
FIG. 3 is a schematic cross-sectional view of a fused capacitor.

A schematic cross-sectional view of a typical fused capacitor is illustrated in FIG. 3. In FIG. 3, the capacitor, generally represented as 30, comprises an anode, 31, with an anode lead, 32, extending there from. A fuse, 33, between the anode lead and lead out electrode or termination, 34, forms an open circuit if a predetermined current is reached thereby at least temporarily taking the capacitor off-circuit. A dielectric, 35, is formed between the anode and cathode, 36. A cathode termination, 37, is in electrical contact with the cathode. An optional protective layer, 38, encases the working components of the capacitor. The cathode lead, 37, extends through a plated through hole or via, 39, in the substrate for direct electrical contact with a cathode pad or cathode trace, 40. The anode extends away from the substrate as illustrated. It would be apparent that the anode and cathode could be reversed with the anode lead extending through a via and the cathode lead being joined with adjacent cathodes through a bridge.

Figure 4:
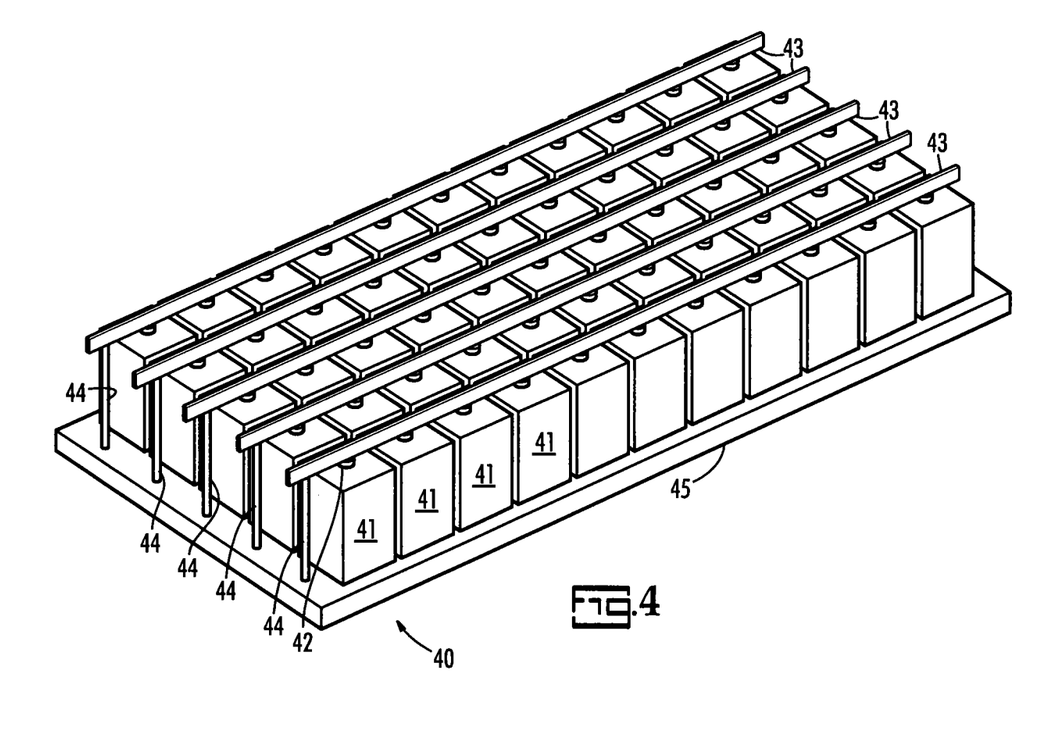
FIG. 4 is a schematic perspective top view of an embodiment of the present invention.
Figure 5:
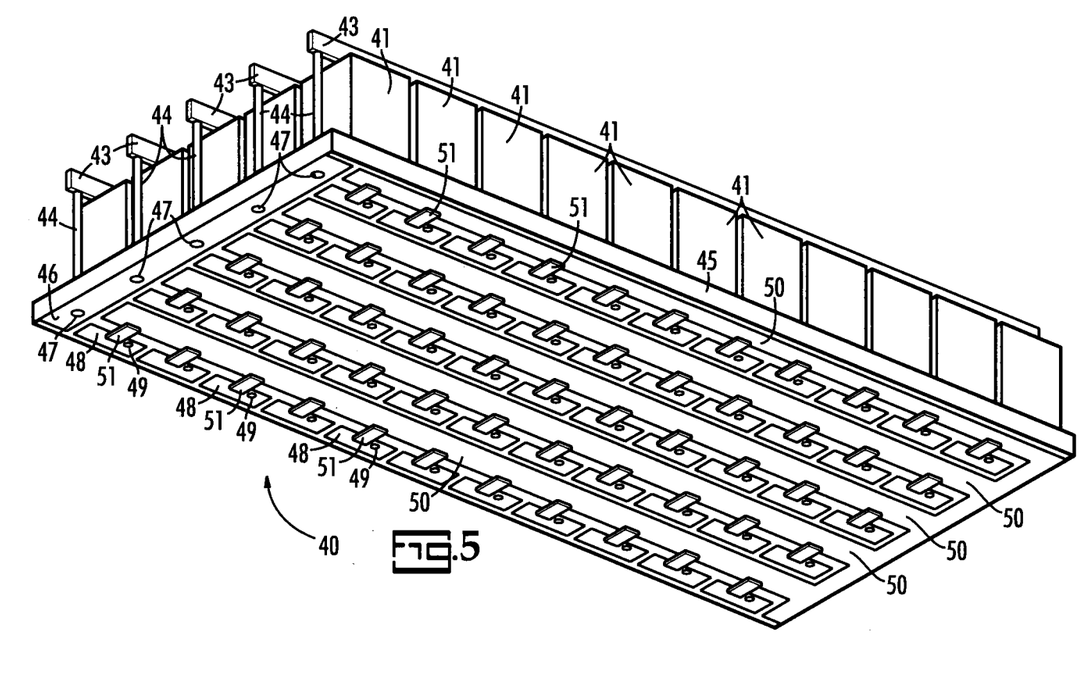
FIG. 5 is a schematic perspective bottom view of the embodiment of FIG. 4.

A particularly preferred embodiment is illustrated in schematic top perspective view in FIG. 4 and schematic bottom perspective view in FIG. 5. The capacitor assembly, generally represented at 40, comprises a multiplicity of capacitors, 41. The capacitors are preferably capacitor slugs wherein there is no external insulator. Each capacitor comprises an anode lead, 42, extending from the interior anode which is not visible. An anode bridge, 43, connects the anode of at least a subset of capacitors. Each anode bridge has an anode tree, 44, which passes to the substrate and preferably through an anode via, 47, of the substrate, 45, and is in electrical contact with an anode trace, 46, preferably on the opposite side of the substrate from the capacitor. The cathode of each capacitor is exposed, at least on the board side, and in electrical contact with a cathode pad, 48, through a cathode via, 49. Each cathode via is electrically connected to a cathode trace, 50, through a fuse, 51. It is preferred that each capacitor be independently fused. Other configurations for achieving this are within the scope of the invention. In use, the cathode assembly would be mounted with the anode trace, 46, and cathode trace, 50, in electrical contact with the appropriate traces on a printed circuit board.

Figure 6:
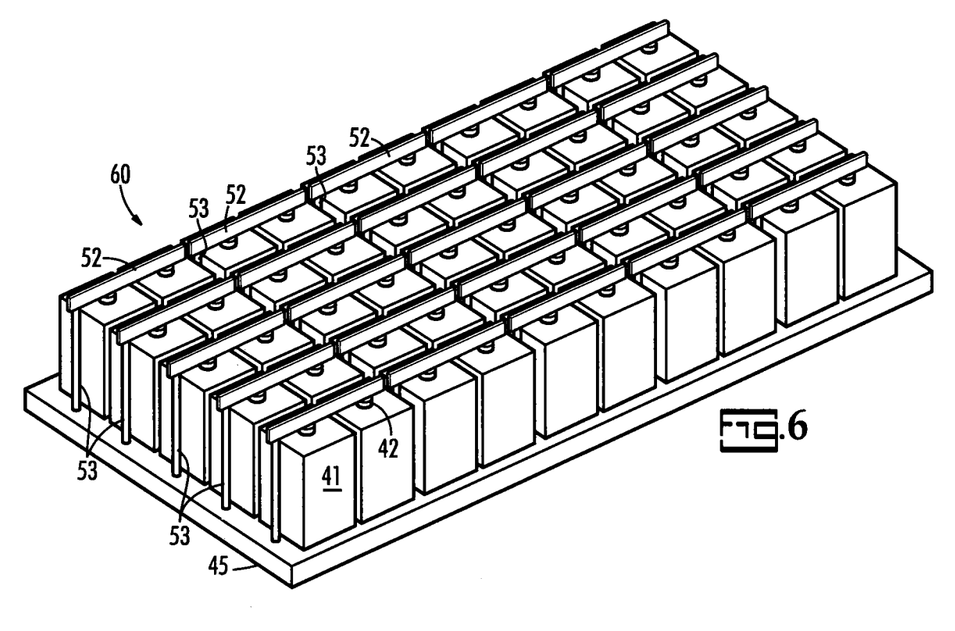
FIG. 6 is a schematic perspective top view of an embodiment of the present invention.

Another embodiment is illustrated in schematic top perspective view in FIG. 6. The capacitor assembly, generally represented at 60, comprises capacitors, 41, anode, 42, substrate, 45, cathode pads, 48, cathode vias, 49, cathode trace, 50, and fuses, 51 as described relative to FIGS. 4 and 5. In the embodiment illustrated in FIG. 6 an anode bridge, 52, connects a subset of anodes preferably in a row or column. Each anode bridge has an anode tree, 53, passing through an anode via (not shown). All or a select set of anode trees may be in contact with a common anode trace. Alternatively, any given anode tree may be in contact with a dedicated anode trace.

Figure 7:
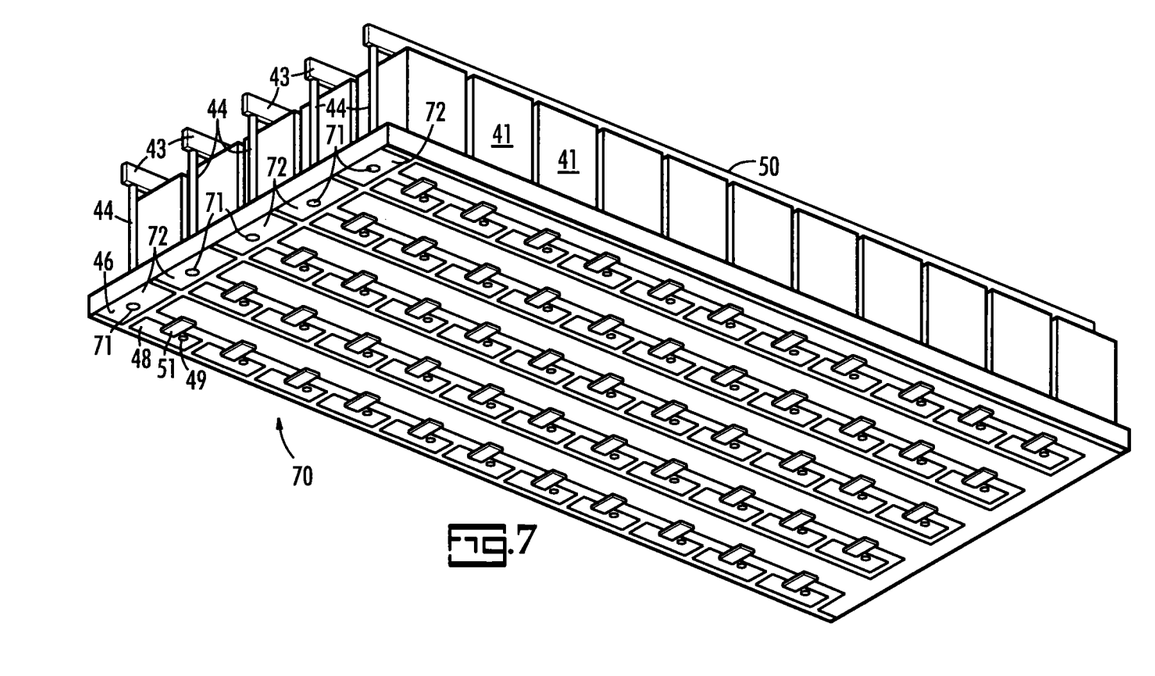
FIG. 7 is a schematic perspective bottom view of an embodiment of the present invention.

Another embodiment is illustrated in schematic bottom perspective view in FIG. 7. The capacitor assembly, generally represented at 70, comprises capacitors, 41, anode (not shown), anode bridge, 43, anode tree, 44, substrate, 45, cathode pad, 48, cathode via, 49, cathode trace, 50 and fuse, 51, as described with reference to FIGS. 4 and 5. In the embodiment of FIG. 7, each anode tree, 44, passes through an anode via, 71, and forms a contact with an anode trace, 72. In this configuration the capacitor assembly can be utilized as five independent capacitor assemblies or they can be combined on the printed circuit board in any combination desired as necessary for the particular circuit design. It would be understood that the anode traces, 72, could be in contact with one or more anode trees as desired.

Figure 8:
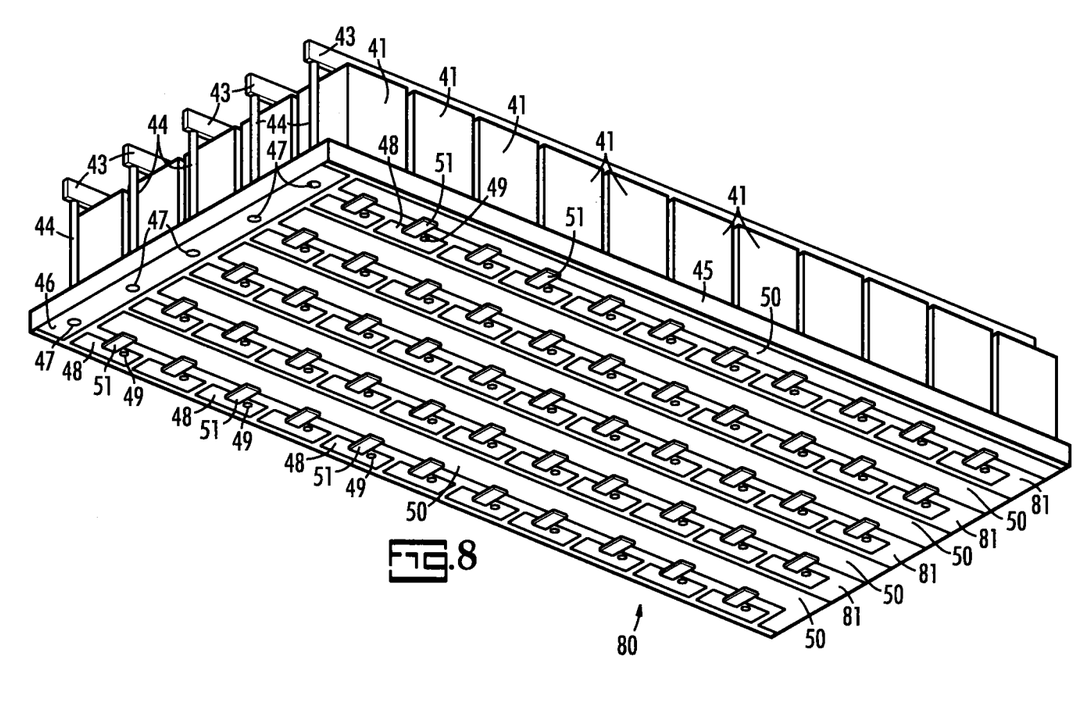
FIG. 8 is a schematic perspective bottom view an embodiment of the present invention.

Another embodiment is illustrated in schematic bottom perspective view in FIG. 8. In FIG. 8, the capacitive assembly, generally represented at 80, comprises a capacitor, 41, anode bridge, 43, anode tree, 44, anode trace, 46, anode via, 47, cathode pad, 48, cathode via, 49, cathode trace, 50 and fuse, 51, as described relative to FIG. 5. In FIG. 8 at least one insulator layer, 81, separates sections of the cathode trace. This allows each column of capacitors to be utilized independently or they can be recombined on the printed circuit board. It would be readily understood that the embodiment of FIG. 8 can be utilized in conjunction with the embodiment of FIG. 7 if desired and this combination is preferable. By combining the embodiments of FIGS. 7 and 8 various configurations can be achieved by re-coupling sets of anodes and cathodes either on the circuit board or by soldering jumpers as necessary.

Figure 9:
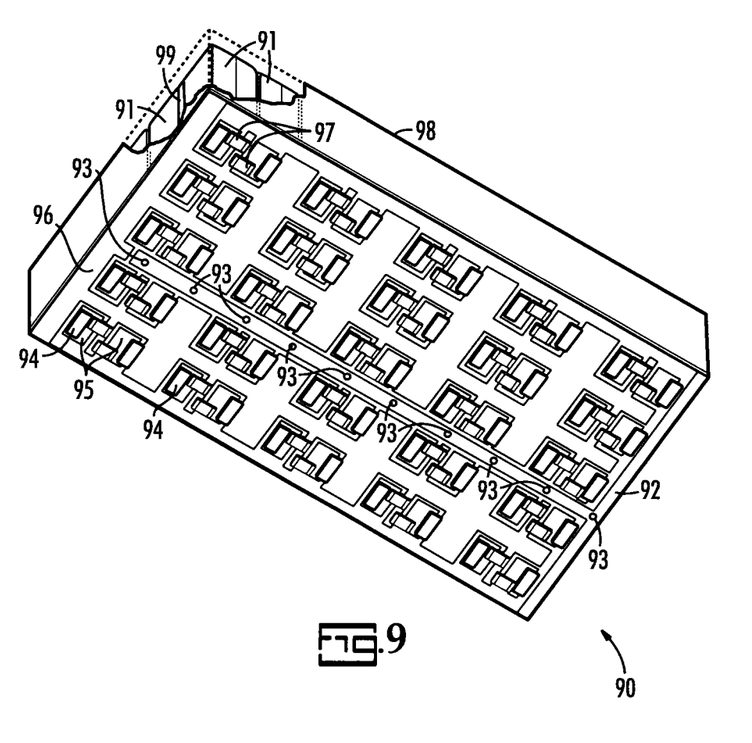
FIG. 9 is a schematic perspective partial cut-away view of an embodiment of the present invention.

A preferred embodiment of the invention is illustrated schematically in partial cut-away view in FIG. 9. In FIG. 9, the capacitor assembly, 90, comprises capacitors, 91. The capacitors may have a non-conducting coating or the surface may be the cathode. The anode (not shown) of the capacitors are joined by anode bridges forming electrical contact with an anode trace, 92, such as through anode vias, 93. A cathode lead, 94, of each capacitor is in electrical contact with a cathode pad, 95, which can be on either face of the substrate but is illustrated on the same face as the anode for simplicity. Each cathode pad is in electrical contact with a cathode trace, 96, preferably through a fuse, 97. The capacitors are preferably encased in a non-electrical conducting material, 98. In one embodiment a potting material, 99, is inserted between the capacitors prior to encasing in the non-conductive material.

The anode is any valve metal or material which functions as a valve metal. Particularly preferred materials include tantalum, niobium, aluminum, titanium, zirconium, hafnium, mixtures, alloys or suboxides or these metals. More preferably the anode comprises one material selected from tantalum, titanium, niobium and niobium oxide. Most preferably the anode comprises tantalum.

The capacitors are preferably mounted with exposed cathodes on the exterior in a closed-packed arrangement. Even more preferred is a packing which is as close as possible yet still sufficiently separated to allow an encasement material to flow between adjacent capacitors. In this embodiment the encasement material acts as a cushion between adjacent capacitors and minimizes damage which may otherwise occur due to vibrations or through physical or thermal shock.

The number of capacitors is not particularly limiting herein. It is preferable that the capacitors be arranged in a rectangular array since this is the simplest to manufacture.

The terms cathode and anode are used herein as typically employed in the art and the preferred orientation is illustrated relative to the substrate. It would be well within the scope of the invention to reverse the anode and cathode throughout all or part of the description without departing from the meets and bounds of the invention.

The capacitors are preferably encased individually, or collectively, in a material which is a non-electrically conducting. The encasing material may be a homogenous material as commonly employed in the art or the encasement material may comprise multiple materials with one being used to fill the gaps between capacitors and the other being used to encase the entire grouping of capacitors. Preferred, but not limiting, encasement materials include epoxy molding compounds preferably highly filled with silicon to match the coefficient of thermal expansion of the surrounding materials. Flexible filled materials, such as anhydrides, are suitable.

The fuse may be an external surface mount fuse or an internal fuse. For manufacturing simplicity an external surface mount fuse is desired. The fuse may be permanent such that when the capacitor is exposed to excessive voltage, current or temperature, the capacitor is permanently incapacitated. Alternatively, the fuse may be a resettable or replaceable fuse. Replaceable fuses are least desirable due to the size typically associated with a replaceable fuse. Permanent fuses typically include a connection through a material which is destroyed by excessive voltage, current or temperature. One type of fuse utilizes materials which melt when exposed to excessive voltage, current or temperature, such as metal wires, metal alloy wires, composite wires, paralytic wire and conductive polymers. The fuse could have a metal plating surface that enhances wire bonding and lowers ESR. The metal surfaces can include nickel, gold and palladium. Particularly preferred permanent fuse materials include gold, aluminum or copper wire. Other materials include positive temperature coefficient (PTC) and polymeric positive temperature coefficient (PPTC) resettable fuses.

The bridge is a conductor suitable for electrically connecting multiple elements as described herein. The bridge is not integral to the substrate upon which the capacitor is primarily mounted.

Throughout the specification the term via refers to either a physical void through which a lead passes or a passage, preferably conductive such as a plated through hole, electrically connecting a conductive element there through.

A particular advantage of the present invention is the ability to greatly increase the capacitance density

EXAMPLE

A capacitor array was prepared in accordance with the prior art with fifty capacitors in a 5×10 grid array. Each capacitor was packed as close as possible without shorts between capacitors. The grid array measured 50 mm×60 mm×5.2 mm for a total volume of 15.6 cc and a footprint of 30 cm$^2$. An inventive capacitor array was prepared using capacitors of the same size in accordance with the present invention with fifty capacitors in a 5×10 grid array. Each capacitor was mounted with the cathode being electrically connected to a common cathode trace through a via at a cathode pad. A 2 amp fuse available commercially from SMC Electronics was employed between each cathode pad and a common cathode trace. Each row of 5 capacitors shared a common anode bridge and each anode bridge had a single anode tree passing through being electrically connected to a common anode trace through vias. The inventive grid array measured 43.5 mm×20.4 mm by 8.9 mm for a total volume of 7.9 cc and a footprint of 8.9 cm$^2$. This illustrates a 49.4% volume savings and a savings in footprint of 70%. Real estate savings of this magnitude are rarely achieved in electronic structures.

The invention has been described with particular reference to the preferred embodiments without limit thereto. One of skill in the art would realize additional embodiments and alterations which are within the scope of the invention which is more specifically set forth in the claims appended hereto.

Claimed is:

1. A capacitor assembly comprising:
   a substrate comprising a first face and a second face;
   a multiplicity of capacitors mounted on said first face wherein each capacitor of said capacitors comprises:
   an anode;
   an anode lead extending away from said substrate and in electrical contact with said anode;
   a cathode; and
   cathode termination in electrical contact with said cathode;
   an anode bridge in electrical contact with multiple anode leads;
   an anode tree in electrical contact with said anode bridge and said anode tree is in electrical contact with an anode trace; and
   a cathode trace wherein said cathode termination is in electrical contact with said cathode trace.

2. The capacitor assembly of claim 1 wherein said capacitor is between said anode bridge and said substrate.

3. The capacitor assembly of claim 1 wherein said anode tree passes through said substrate.

4. The capacitor assembly of claim 3 wherein said anode tree passes through a via of said substrate.

5. The capacitor assembly of claim 1 wherein said anode trace is on said second face.

6. The capacitor assembly of claim 1 wherein said cathode trace is on said first face.

7. The capacitor assembly of claim 1 wherein said cathode termination extends through said substrate.

8. The capacitor assembly of claim 7 wherein said cathode trace is on said second face.

9. The capacitor assembly of claim 1 further comprising at least one fuse in one location selected from between said anode lead and said anode trace and between said cathode termination and said cathode trace.

10. The capacitor assembly of claim 1 wherein at least one capacitor further comprises a fuse.

11. The capacitor assembly of claim 1 further comprising a pad in electrical contact with said cathode lead and a fuse between said pad and said cathode trace.

12. A capacitor assembly comprising:
   a substrate comprising a first face and a second face;
   a multiplicity of capacitors mounted on said first face wherein each capacitor of said capacitors comprises:
   a first lead and a second lead of opposite polarity to said first lead; and
   a bridge in electrical contact with multiple first leads;
   a tree in electrical contact with said bridge and in electrical contact with a first trace;
   a pad in electrical contact with said second lead;
   a second trace; and
   a fuse between said pad and said second trace.

13. The capacitor assembly of claim 12 wherein said tree passes through said substrate.

14. The capacitor assembly of claim 13 wherein said tree passes through a via of said substrate.

15. The capacitor assembly of claim 12 wherein said first trace is on said second face.

16. The capacitor assembly of claim 12 wherein said second trace is on said second face.

17. The capacitor assembly of claim 12 wherein one of said first trace and said second trace is on said first face.

18. The capacitor assembly of claim 12 wherein said first lead is an anode lead.

19. The capacitor assembly of claim 12 further comprising at least one fuse in one location selected from between said first lead and said first trace and between said second lead and said second trace.

20. The capacitor assembly of claim 12 wherein at least one capacitor further comprises a fuse.

21. The capacitor assembly of claim 12 further comprising a pad in electrical contact with said second lead and a fuse between said pad and said second trace.

22. The capacitor assembly of claim 12 wherein each capacitor comprises an insulating coating.

23. The capacitor assembly of claim 12 wherein multiple capacitors comprise a common insulating coating.

24. The capacitor assembly of claim 12 wherein each first lead is in electrical contact with a common first trace.

25. The capacitor assembly of claim 12 wherein each second lead is in electrical contact with a common second trace.

26. The capacitor assembly of claim 12 comprising multiple bridges.

27. The capacitor assembly of claim 26 comprising a tree for each bridge of said bridges.

28. The capacitor assembly of claim 27 wherein each tree is in electrical contact with a common first trace.

29. The capacitor assembly of claim 27 wherein each tree is in electrical contact with a separate first trace.

30. A capacitor assembly comprising:
a substrate comprising a first face and a second face;
a multiplicity of capacitors mounted on said first face wherein each capacitor of said capacitors comprises:
a anode and an anode lead extending through said substrate and in electrical contact with said anode;
a cathode and cathode termination in electrical contact with said cathode;
a bridge in electrical contact with multiple cathode terminations;
a tree in electrical contact with said bridge and said cathode;
a cathode trace in electrical contact with said tree; and
an anode trace in electrical contact with said anode lead.

31. The capacitor assembly of claim 30 wherein said capacitor is between said anode bridge and said substrate.

32. The capacitor assembly of claim 30 wherein said anode trace is on said second face.

33. The capacitor assembly of claim 30 wherein at least one capacitor further comprises a fuse.

34. The capacitor assembly of claim 30 further comprising a pad in electrical contact with said anode and a fuse between said pad and said anode trace.

35. The capacitor assembly of claim 30 wherein each capacitor comprises an insulating coating.

36. The capacitor assembly of claim 30 comprising multiple bridges.

37. A capacitor assembly comprising:
a substrate comprising a first face and a second face;
a multiplicity of capacitors mounted on said first face wherein each capacitor of said capacitors comprises:
a first lead and a second lead of opposite polarity to said first lead; and
a bridge in electrical contact with multiple first leads;
a tree in electrical contact with said bridge wherein said tree is in electrical contact with a first trace; and
a second trace wherein said second lead is in electrical contact with said second trace;
wherein at least one capacitor further comprises a fuse; and
wherein each capacitor comprises an insulating coating.

38. The capacitor assembly of claim 37 wherein said first trace is on said second face.

39. The capacitor assembly of claim 37 wherein said second trace is on said second face.

40. The capacitor assembly of claim 37 wherein one of said first trace and said second trace is on said first face.

* * * * *

UNITED STATES PATENT AND TRADEMARK OFFICE
CERTIFICATE OF CORRECTION

| | | |
|---|---|---|
| PATENT NO. | : 8,760,848 B2 | |
| APPLICATION NO. | : 13/315931 | |
| DATED | : June 24, 2014 | |
| INVENTOR(S) | : Prymak et al. | |

It is certified that error appears in the above-identified patent and that said Letters Patent is hereby corrected as shown below:

In Item (75) on the Title page of the patent, the second inventor's name should read as follows:

Blais, Peter

Signed and Sealed this
Eleventh Day of November, 2014

Michelle K. Lee
*Deputy Director of the United States Patent and Trademark Office*